(12) United States Patent
Lin

(10) Patent No.: US 10,543,808 B2
(45) Date of Patent: Jan. 28, 2020

(54) PASSIVE REMOTE KEYLESS ENTRY SYSTEM WITH LEVEL-BASED ANTI-THEFT FEATURE

(71) Applicant: Xing Ping Lin, Orchard Lake, MI (US)

(72) Inventor: Xing Ping Lin, Orchard Lake, MI (US)

(73) Assignee: TRW AUTOMOTIVE U.S. LLC, Farmington Hills, MI (US)

( * ) Notice: Subject to any disclaimer, the term of this patent is extended or adjusted under 35 U.S.C. 154(b) by 0 days.

(21) Appl. No.: 14/326,585

(22) Filed: Jul. 9, 2014

(65) Prior Publication Data

US 2015/0022332 A1 Jan. 22, 2015

Related U.S. Application Data

(60) Provisional application No. 61/856,884, filed on Jul. 22, 2013.

(51) Int. Cl.
*B60R 25/10* (2013.01)
*B60R 25/00* (2013.01)

(52) U.S. Cl.
CPC .................................... *B60R 25/00* (2013.01)

(58) Field of Classification Search
CPC ................................ B60R 25/00; B60R 25/20
See application file for complete search history.

(56) References Cited

U.S. PATENT DOCUMENTS

| | | | | |
|---|---|---|---|---|
| 5,723,911 A * | 3/1998 | Glehr | ...................... | B60R 25/24 180/287 |
| 6,326,885 B1 * | 12/2001 | Togashi | .............. | B60R 25/1003 307/10.2 |
| 6,617,961 B1 * | 9/2003 | Janssen | ................. | B60R 25/245 307/10.1 |
| 6,816,081 B1 | 11/2004 | Okada et al. | | |
| 6,885,283 B2 * | 4/2005 | O'Connor | ........... | B60C 23/0408 340/10.1 |
| 7,397,344 B2 * | 7/2008 | Nantz | ................... | B60R 25/209 340/5.64 |
| 7,928,829 B2 * | 4/2011 | Hermann | ................ | B60R 25/24 340/5.2 |
| 8,659,388 B2 | 2/2014 | Biondo et al. | | |
| 8,907,762 B2 * | 12/2014 | Kawamura | ........... | B60R 25/245 340/426.36 |

(Continued)

FOREIGN PATENT DOCUMENTS

CN 102237938 11/2011

OTHER PUBLICATIONS

"New Door Closure Concepts", authors Stephan Schmitz et al., pp. 118-120, Automotive Engineering International/Sep. 2000.

(Continued)

*Primary Examiner* — Quang Pham
(74) *Attorney, Agent, or Firm* — Tarolli, Sundheim, Covell & Tummio LLP

(57) ABSTRACT

Method for preventing security breaches via the two-thief method of attack of passive remote keyless entry systems for vehicles. The method involves the transmission of a signal between a fob and the vehicle, where the level of the signal changes in a particular pattern. At the receiving side, anomalies in the pattern of the received signal (e.g., levels, timing) are detected and used to detect attempts to mimic the signal.

18 Claims, 4 Drawing Sheets

(56) References Cited

U.S. PATENT DOCUMENTS

| | | | | |
|---|---|---|---|---|
| 8,935,052 B2* | 1/2015 | Hermann | | B60R 25/20 701/302 |
| 10,269,199 B2* | 4/2019 | Lickfelt | | G07C 9/00309 |
| 2006/0114100 A1* | 6/2006 | Ghabra | | E05B 81/78 340/5.61 |
| 2006/0164207 A1* | 7/2006 | Wilcox | | B60R 25/24 340/5.61 |
| 2006/0267744 A1* | 11/2006 | Baumgartner | | B60R 25/24 340/426.36 |
| 2007/0024416 A1 | 2/2007 | Tang et al. | | |
| 2008/0079603 A1 | 4/2008 | King et al. | | |
| 2008/0088411 A1* | 4/2008 | Ghabra | | B60R 25/24 340/5.64 |
| 2008/0143500 A1* | 6/2008 | Ghabra | | B60R 25/24 340/426.36 |
| 2009/0179772 A1* | 7/2009 | Yamamoto | | B60R 25/2072 340/901 |
| 2010/0321154 A1* | 12/2010 | Ghabra | | B60R 25/00 340/5.61 |
| 2011/0153120 A1 | 6/2011 | Katou | | |
| 2012/0126943 A1* | 5/2012 | Biondo | | G07C 9/00182 340/5.64 |
| 2012/0236957 A1* | 9/2012 | Tomita | | H04L 27/12 375/272 |
| 2013/0076484 A1 | 3/2013 | Nishiguchi | | |
| 2013/0106577 A1* | 5/2013 | Hinman | | G06K 7/10267 340/10.1 |
| 2014/0043139 A1* | 2/2014 | Humphrey | | B60R 25/245 340/5.72 |
| 2014/0067161 A1* | 3/2014 | Conner | | B60R 25/20 701/2 |
| 2014/0091903 A1* | 4/2014 | Birkel | | B60R 25/24 340/5.54 |
| 2014/0132391 A1* | 5/2014 | Eder | | G07C 9/00309 340/5.21 |
| 2014/0169193 A1* | 6/2014 | Eder | | H04L 43/08 370/252 |
| 2014/0330449 A1* | 11/2014 | Oman | | G01S 13/765 701/2 |
| 2015/0074805 A1* | 3/2015 | Choi | | H04W 4/008 726/22 |
| 2015/0302729 A1* | 10/2015 | Pilat | | G08C 19/28 340/5.25 |
| 2016/0086401 A1* | 3/2016 | Choi | | H04W 4/008 340/5.61 |
| 2016/0200291 A1* | 7/2016 | Kim | | B60R 25/30 701/2 |
| 2016/0280184 A1* | 9/2016 | Katou | | B60R 25/24 |
| 2016/0304052 A1* | 10/2016 | Naitou | | B60R 25/24 |
| 2016/0332597 A1* | 11/2016 | Tokunaga | | B60R 25/24 |
| 2017/0004664 A1* | 1/2017 | Yamamoto | | G07C 9/00309 |
| 2017/0158168 A1* | 6/2017 | Nantz | | G07C 9/00309 |
| 2017/0158169 A1* | 6/2017 | Luo | | B60R 25/245 |

OTHER PUBLICATIONS

"Some Attacks Against Vehicles' Passive Entry Security Systems and Their Solutions", authors Ansaf Ibrahem Alrabady & Syed Masud Mahmud, pp. 431-439, IEEE Transactions on Vehicular Technology, vol. 52, No. 2, Mar. 2003.

Relay Attacks on Passive Keyless Entry and Start Systems in Modern Cars:, authors Aurellien Francillon et al., Feb. 7, 2011—Associated Event: NDSS Symposium 2011.

* cited by examiner

PASSIVE REMOTE KEYLESS ENTRY SYSTEM WITH LEVEL-BASED ANTI-THEFT FEATURE

CROSS REFERENCE TO RELATED APPLICATIONS

This patent application claims priority to and the benefit of U.S. Provisional Application Ser. No. 61/856,884, filed Jul. 22, 2013, entitled PASSIVE REMOTE KEYLESS ENTRY SYSTEM WITH LEVEL-BASED ANTI-THEFT FEATURE, which is incorporated herein by reference in its entirety.

FIELD OF THE INVENTION

The present invention is directed to methods for preventing security breaches via the two-thief method of attack of passive remote keyless entry systems for vehicles.

BACKGROUND

Vehicles today are often equipped with electronic entry systems. Such systems allow entry into, and (in some systems) starting and operation of, the vehicle without using a conventional mechanical key or requiring any other overt unlocking action by the owner. In such systems, often referred to as 'passive' remote keyless entry ("RKE") systems, a low frequency ("LF") radio signal, typical around 125 KHz, is transmitted by the vehicle to a fob carried by the vehicle owner, and the fob responds by returning a radio frequency ("RF") signal (e.g. 315 MHz or 434 MHz) back to the vehicle. Upon receipt of an RF signal from an authorized fob, the vehicle will unlock the doors to permit driver entry into the vehicle.

More specifically, when a driver approaches the vehicle and lifts the handle of the vehicle door, the driver contact with the door handle will be detected electronically at the vehicle (e.g. by tripping a mechanical switch when the handle is lifted, or by electrostatic detection of touch, or by the driver's fingers interrupting an optical beam). Upon detection of the driver contact with the door handle, the RKE controller at the vehicle will trigger an LF transmitter inside the controller. The LF transmitter will create an LF field in the vicinity of the vehicle door that will, in turn, be detected by an LF receiver inside the fob. Upon detection of a proper LF field, the fob will compose and transmit back to the vehicle a digital message (a datagram) modulated on an RF signal. The RF receiver inside the vehicle will demodulate and decode the digital message and, if the content of the message indicates that the message came from an authorized fob, will unlock the vehicle doors. Similar methods are sometimes used for enabling an "engine start" button on the dashboard of the vehicle, whereby the owner may even operate the vehicle without use of a mechanical key.

Identification codes and encryption are conventionally used to ensure that the communication link between the fob and the vehicle is secure. Such codes and encryption are very difficult to duplicate. Therefore, the fob message required to gain entry into the vehicle cannot readily be synthesized by a thief. Even with such codes and encryption, however, potential vulnerabilities still exist. One known vulnerability involves two thieves working in concert to intercept and immediately use a bona fide fob message to trick the vehicle RKE system into believing that the fob is near the vehicle, when in fact the person carrying the fob has walked away from the vehicle.

The two-thief scenario is depicted in FIG. 1. In this scenario, each thief carries an RE relay device. Radio signals received at one device are relayed to the other device via a different, device-to-device frequency channel. At the other device, the radio signals are returned to their original frequency channel and re-broadcast.

When the person carrying the fob leaves the vehicle and walks away, the first thief will position himself and his device near the vehicle. The second thief will follow the person carrying the fob, thereby keeping the second thief's device near the fob. The first thief will approach the vehicle and lift the door handle, triggering the LF transmitter inside the vehicle. The first theft's device will be designed to receive the LF signal transmitted by the LF transmitter inside the vehicle, to frequency-shift the LF signal to the different, device-to-device frequency channel, and to broadcast the frequency-shifted signal to the second thief.

The second thief's device will receive the frequency-shifted signal via the device-to-device frequency channel. The device will frequency-shift the signal back to its original LF channel and then re-transmit it. The fob, being in the vicinity of the second thief's device, will receive the LF signal and, so long as the device-to-device communication process has not corrupted the LF signal very much, will interpret it as a legitimate LF interrogation from the vehicle. The fob will thus respond by assembling a datagram for accessing the vehicle, including all of the associated security codes and encryption, and then transmitting the datagram as an RF message.

The second thief's device will be designed to receive the RF signal transmitted by the fob, to frequency-shift the RF signal to the different, device-to-device frequency channel, and to broadcast the frequency-shifted signal back to the first thief. The first thief s device will receive the frequency-shifted signal via the device-to-device frequency channel. The device will then restore (frequency-shift) the fob signal back to its original RF channel and re-transmit it. The vehicle, being near the first thief's device, will receive the restored RF signal and decode the included datagram. So long as the device-to-device communication process has not corrupted the RF signal very much and assuming that the associated security codes and encryption were generated by an authorized fob, the vehicle will recognize the RF signal as a legitimate RF response from the fob. The vehicle will thus respond by allowing access to the vehicle, unlocking the doors and (in some systems) allowing starting and operation of the vehicle.

Thus, in summary, through use of this technique the two thieves avoid the necessity of understanding and synthesizing the security codes and encryption used by the fob, instead triggering the fob to create a legitimate access message and then transporting the message back to the vehicle to gain access to the vehicle.

SUMMARY OF THE INVENTION

The present invention provides a methods for defeating a two-thief attack on a passive RKE system.

In accordance with one example embodiment of the present invention, a method is provided for preventing security breaches of remote keyless entry systems for a vehicle. The method comprises the steps of transmitting a signal between a fob and the vehicle, where the level of the transmitted signal changes in a particular pattern, and detecting anomalies in the pattern of the received signal at the receiving side.

In accordance with another embodiment of the present invention, a method is provided for preventing security breaches of a passive remote keyless entry system for a vehicle. The method includes the steps of transmitting a signal from a fob to the vehicle at a level which changes in a particular pattern, receiving the signal at the vehicle, detecting deviations of the received signal from the particular pattern, and performing a vehicle function only if the deviations are within acceptable limits.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
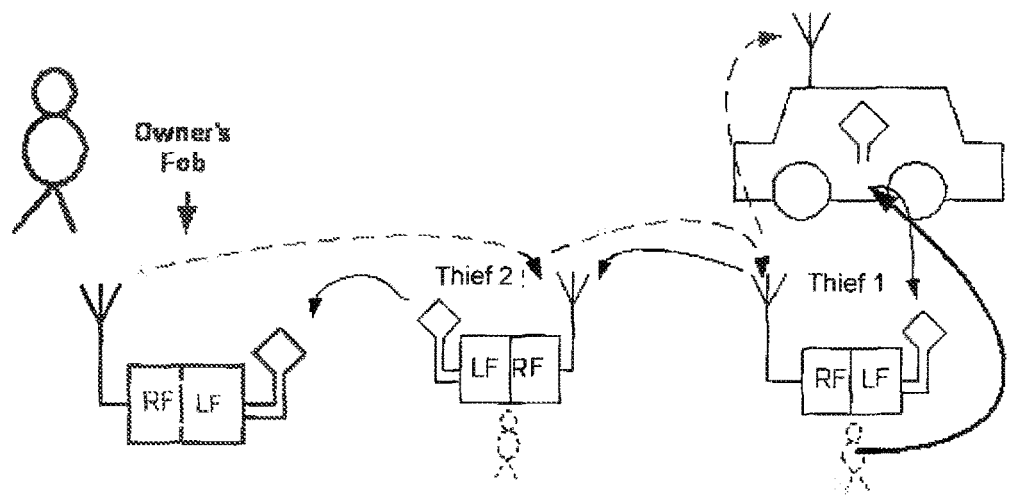
FIG. 1, already described above, illustrates the known two-thief scenario for avoiding the security features of conventional passive RKE systems.
Figure 2:
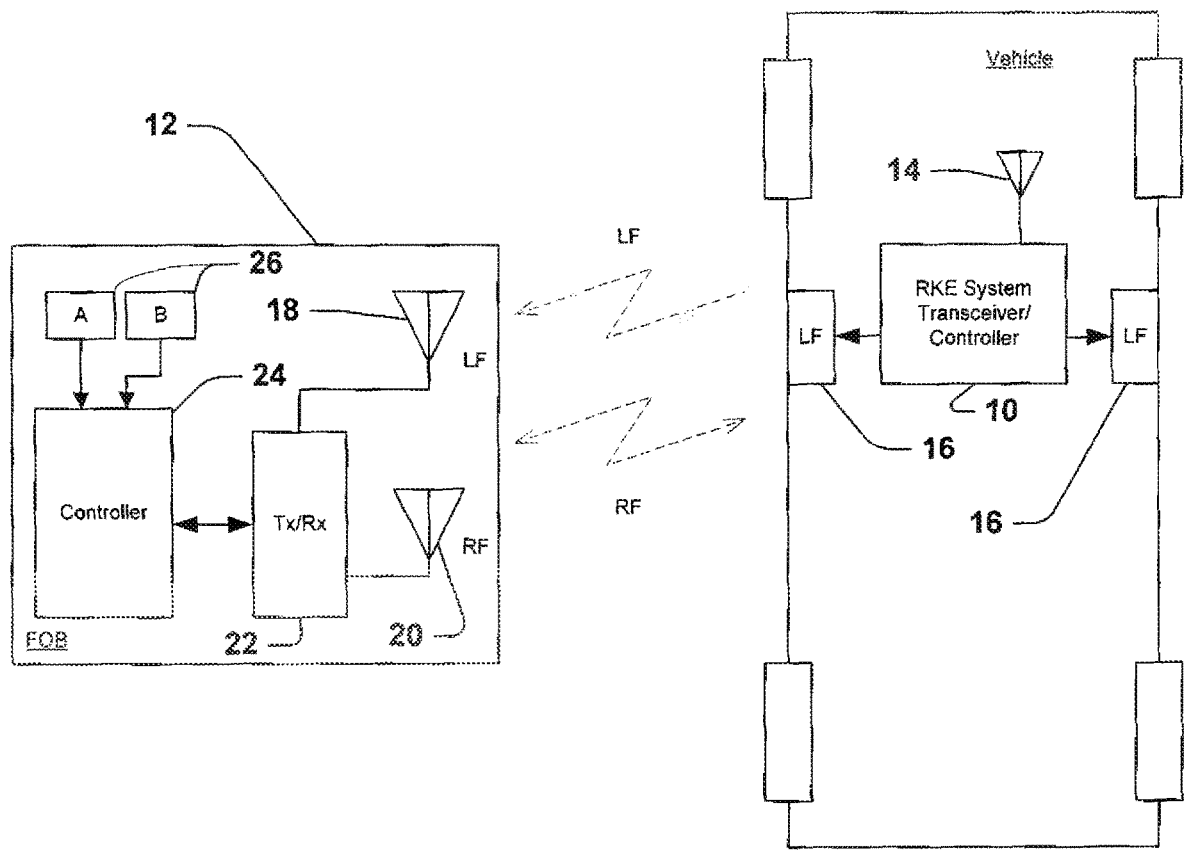
FIG. 2 is a block diagram of a passive RKE system including LF interrogation by the vehicle and RE response from the fob.

The present invention will find use in any conventional passive RKE system, such as the system shown in block diagram form in FIG. 2. As shown in FIG. 2, the system includes a vehicle-mounted RKE controller 10 that communicates with a portable, battery-operated fob 12. The fob is small and will be carried close at hand by the vehicle operator in his/her pocket or hand, on a lanyard or in a bag, etc.

The vehicle-mounted RKE controller 10 is of known construction and will include, for example, a microcontroller including a system clock generator, a central processing unit (CPU), program memory (ROM), random access memory (RAM), programmable timers, analog-to-digital and digital-to-analog convertors, interrupt controllers, serial interfaces, and so on. The RKE controller may also include a separate digital signal processor (DSP) integrated circuit to simplify the process of performing a fast Fourier transform (FFT) analysis of the received signal. The RKE controller operates various vehicle systems (not separately shown) including entry controls, ignition controls, and other systems. The functioning of the RKE controller is managed by the CPU operating under control of a program stored in ROM.

The RKE controller 10 will operate the controlled systems in response to radio communications exchanged with the fob 12. For this purpose, the RKE controller 10 will include (a) an RF antenna 14 and an RF transceiver for receiving and transmitting RF messages to and from the fob on a carrier frequency of, for example, 315 MHz, and (b) one or more LF antennas 16 and an LF transmitter for generating a localized LF field at a frequency of, for example, 125 kHz, for triggering a fob to send an RF message.

The fob 12 will similarly be equipped with LF and RF antennas 18 and 20, respectively, so that the fob may receive the LF signals broadcast from the LF antennas on the vehicle and may receive RF signals from, and transmit RF signals to, the RE antenna on the vehicle. The LF and RF antennas are connected to a transmitter/receiver 22, which in turn is connected to and controlled by a fob controller 24. The controller may be an application specific integrated circuit ("ASIC") configured as a state machine, or a programmed microcomputer. In either case, the controller will monitor the states of buttons 26 (e.g., buttons A and B in the figure) on the fob 12 and broadcast via the RF antenna 20 suitable RF messages responsive to button depressions performed by the person holding the fob. The fob controller 24 will also cause the transmitter/receiver 22 to listen for LF or RF interrogation or signals broadcast by the vehicle and received by the fob's LF or RE antenna, and will broadcast via its RF antenna 20 suitable RF messages responsive to the LF or RF signals received. The message will be transmitted with security codes and encryption.

In accordance with the present invention, an antitheft method and associated apparatus is introduced for defeating the two-thief scenario. The method may be implemented in the system shown in FIG. 2, for example. The method involves use of fob transmissions of different power levels, with the sequence of power level changes encrypted (known only to the matched fob and vehicle RKE controller) and aided by gain, frequency, and data rate and bandwidth control. Although, in the embodiment described, the multi-level transmissions originate at the fob and are received by the vehicle RKE controller, it is possible to accomplish the same anti-theft result with RF transmissions in the other direction (RKE controller to fob) or indeed in both directions.

The fob will transmit an RF signal that will have different amplitudes in different amplitude symbol intervals. For example, the fob may be designed to transmit at any one of three different levels: high ("A"), medium ("B"), or low ("C"). The sequence of the amplitude levels is encrypted, meaning that it will be known only by the fob and the vehicle RKE controller. Any known method of generating synchronized pseudorandom number sequences (in this case, modulo 3 since three amplitude levels are used in the present example), at the fob and vehicle may be used. As the sequence of amplitude variations is pseudorandom, only the fob and the vehicle RKE controller will know the sequence. In particular, a thief will not know the sequence.

Figure 3:
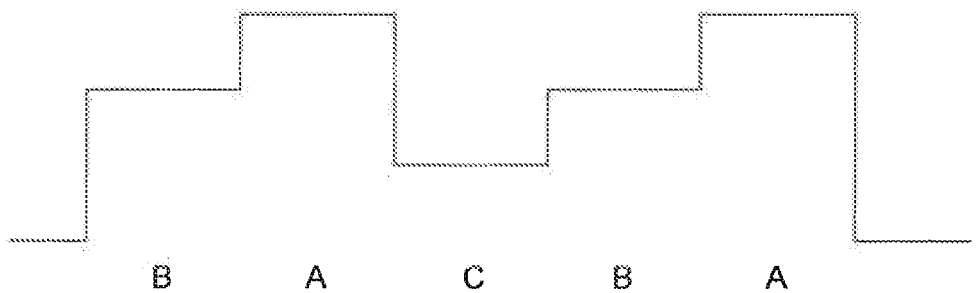
FIG. 3 is a representation of one possible multi-level fob transmission sequence.

FIG. 3 shows one example of a transmission from the fob, where the fob transmits at the three different amplitude levels in a sequence of five amplitude symbol intervals having the amplitudes B-A-C-B-A. This amplitude sequence will be imposed on the RF response from the fob to the vehicle, which RF response will normally comprise an RF signal that is frequency-shift-keyed (FSK) modulated with a fob datagram containing a fob identification code, an access request, and possibly other data elements, all encrypted with a rolling code.

Preferably, two of the fob power levels will be extreme, to further complicate the difficulty that thieves will encounter in relaying the fob RF response. The highest power level will be very strong and the lowest power level will be very weak. As will be described in more detail below, the RKE controller will know the sequence and thus will be able to anticipate the levels by making suitable adjustments to the RF receiver. The thief device, however, won't be able to anticipate the extreme changes.

In order to be sensitive enough to receive the weak signal, a thief device will have to be configured with a reasonably narrow bandwidth and high gain. A high sensitivity receiver such as this, however, can easily be driven into saturation mode or into a nonlinear amplification mode by a very strong signal. Thus, when a strong signal is transmitted by the fob, the thief device output level change will not reflect the input signal level change. Consequently, the amplitude difference between the respective levels of the fob signal will be altered. This alteration may be detected at vehicle RKE controller.

The thief devices may include additional circuitry for checking and correcting their transmitted level to accurately mimic the fob transmitting levels, but such extra processing will add additional signal delays. The added signal delays will alter the timing of the retransmitted signal. This alteration may, again, be detected at the vehicle RKE controller.

The multi-level nature of the fob signal will therefore present a significant level of difficulty for thieves. Thieves will now face the difficult task of detecting the changing aspects of the multi-level message from the fob back to the vehicle and reproducing those aspects with sufficient fidelity to fool the RKE receiver into accepting the access request. One can conceive of various techniques that might be used by a thief for relaying the multi-level message, but each such technique will introduce signal distortions, as described above, that can be detected at the vehicle and used to block vehicle access in those cases. With some relay techniques, the amplitude of the signals in the various amplitude symbol intervals will be distorted due to multiple stages of signal loss through the air and signal gain within the thief devices. Other relay techniques will introduce signal delays in the reproduction of the signal in the individual amplitude symbol intervals. The problem will be exacerbated if the fob frequency may also change, since that will mandate that the thief's devices have wider bandwidth, which in turn will result in less signal strength linear range. In accordance with the present invention, the RKE controller is designed to detect distortions introduced by such thief devices.

More specifically, in the presently described embodiment, the RKE controller measures a number of parameters of the RF response: (1) the absolute received signal amplitude level (received signal strength indicator, or "RSSI", level), (2) the relative signal level differences of the received RSSI in different amplitude symbol intervals, (3) any extra process time that is introduced into the RF response by a thief as part of a signal relay process, (4) duration of each level or pulse integrity (such as bit width, duty cycle), (5) carrier frequency changes or clock accuracy, and (6) frequency content of the signal. Each of these parameters is discussed below.

Figure 4:
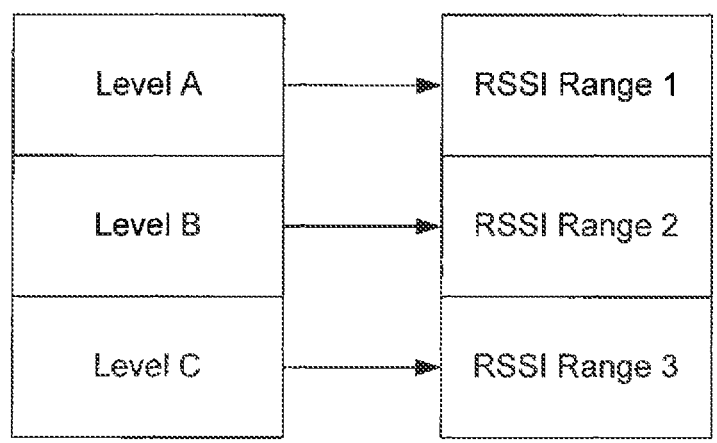
FIG. 4 is chart showing the mapping of fob transmission levels into receiver RSSI ranges.

At the vehicle, the RKE controller will receive the transmission from the fob, will measure the RSSI level in each amplitude symbol interval, and will categorize the absolute RSSI level as falling in one of a number of ranges matching the number of individual power levels used by the fob. As shown in FIG. 4, the RSSI level in each amplitude symbol interval is categorized in the present example embodiment as falling into one of three RSSI ranges 1, 2, and 3 corresponding to levels "A", "B", and "C" respectively.

To give the RF receiver within the RKE controller greater dynamic range and allow greater separation between different RSSI ranges (particularly if extreme levels are used at the highest and lowest power levels), the RF receiver will include a controllable gain and/or controllable attenuation stage. The RKE controller will switch the gain/attenuation of the receiver in synchronism with the expected sequence of amplitudes. That is, the receiver gain will be diminished when a signal of high amplitude "A" is expected, and increased when a signal of low amplitude "C" is expected. Also, or instead, the bandwidth of the receiver may be reduced when very low power level signals are expected. The categorization of the signal amplitudes will be gain-compensated such that the receiver gain adjustment does not affect the amplitude categorization process.

In addition to categorizing the absolute RSSI in each amplitude symbol interval, the RKE controller will determine the relative amplitudes of the signals in the respective amplitude symbol intervals and will compare those relative amplitudes with stored ratios reflecting the known variations that should exist between the different amplitudes.

If the RF transmission is received directly from the fob, the resulting sequence of amplitudes should match the sequence that the fob is expected to provide. If the sequence does not match the expected sequence, access to the vehicle will be disallowed. To enhance the security provided by this system, the sequence of level transitions is many amplitude symbol intervals in length. In addition, the one or few signal levels will change at certain encrypted sequence, but still each level will remain inside its range level. The RKE controller maintains a running count of the number of signal amplitude errors, absolute and relative. At the conclusion of the sequence, the amplitude error count is compared against a stored threshold. If the error count exceeds the expected successful rate, then access to the vehicle is denied.

The RKE controller also looks for unexpected delays in the RF signal sequence returned by the fob, as such delays will indicate that a thief device exists in the signal path between the fob and the vehicle. If the fob is close to the vehicle and is in direct communication with the vehicle RKE controller, there will be minimal delays in the response by the fob to the LF initiation by the RKE controller. The delays that do exist will have been previously characterized and stored in memory within the RKE controller along with the RKE controller's operating program. Alternatively, the normal delays could be measured by the RKE controller during initial matching of the fob to the vehicle, and those measured delays stored in memory. In any case, the RKE controller will measure actual delays in the RF response received at the vehicle and will compare those delays to the expected delays. If the actual delay does not approximately match the expected delay (in other words, is not less than the delay plus an increment reflecting normal delay variation) access to the vehicle will be denied.

Figure 5:
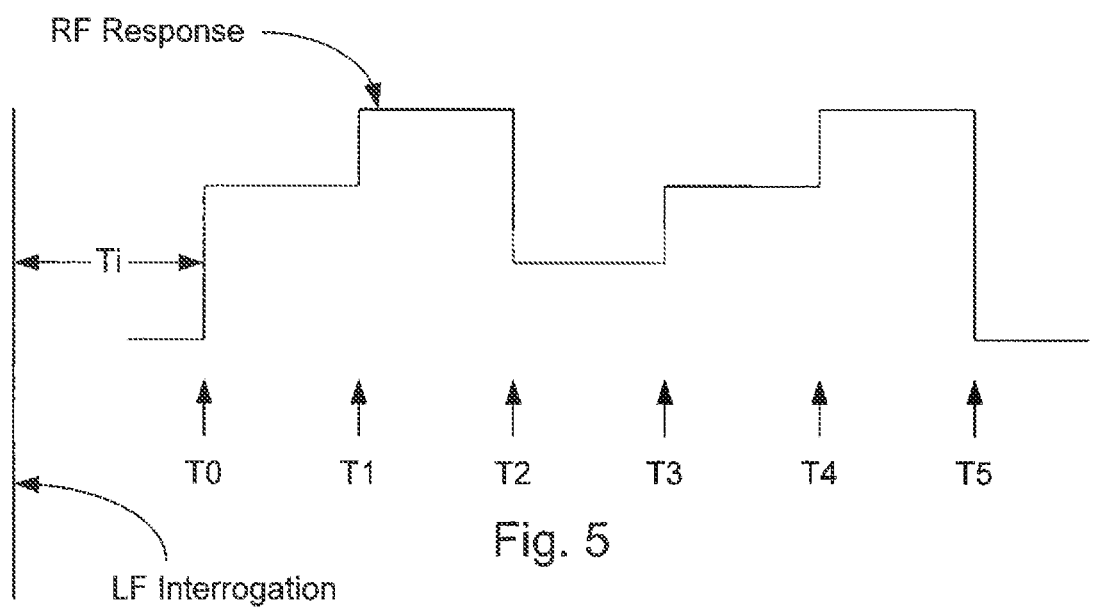
FIG. 5 is a representation of the signal received by the RKE controller in response to the fob signal of FIG. 3.

In the example embodiment being described, the RKE controller measures the time of each of several transitions of the amplitude within the RF response received from the fob. As illustrated graphically in FIG. 5, the transition at the trailing edge of each amplitude symbol interval (n) should take place at time ($T_n = n \ast T_s + T_i$), where $T_s$ is the length of the amplitude symbol interval and $T_i$ is expected length of the initial delay in RF response from the fob. Where a thief is relaying the RF response signal, the actual value of the initial delay $T_i$ will be greater due to extra delays introduced by the circuitry used to measure and accurately mimic the changing amplitude of the fob response. The length of $T_i$ may be determined by measuring the time of occurrence of a single transition, or the measurement may be improved by determining $T_i$ from multiple amplitude symbols and averaging the various $T_i$ measurements.

Thus, RKE controller initiates a timer (clocked counter) inside the controller when, responsive to the lifting of a door handle, the RKE controller sends an LF interrogation signal to the fob. The running value of the timer is captured and recorded at each signal level transition in the RF response. The recorded values of the transitions are used to determine respective values of Ti by subtracting from each recorded value the corresponding (n*Ts) value. The resulting Ti values are averaged and compared with a stored 'normal' value for Ti. Access is denied if the actual measured value for Ti is greater than expected.

The above-described process may be augmented in various ways to further enhance the security of the described methods.

The modulation format of the transmission in each amplitude symbol interval can be amplitude shift keyed (ASK) or short burst FSK on and off at each level. During ASK intervals, the imposed amplitude variations may be thought of as adjustments in the "on" amplitude for the ASK signal. The use of different modulation formats transmitted in an encrypted sequence adds another level of difficulty for a thief. For a thief device to relay the fob signal, the device may need to have the capability of detecting FSK and ASK simultaneously. This adds complexity and further signal delays, exaggerating the difference between normal and 'thief intervention' times and further simplifying detection of an intrusion attempt.

The data rate of the RF response may also be changed from interval to interval, as this will affect the ability of any RSSI circuit to measure with accuracy the amplitude of the signal in each interval. If the data rate is changed from amplitude symbol interval to symbol interval, the accuracy of the RSSI measurement by any thief devices will change too. The vehicle RKE controller, on the other hand, knows the sequence of data rates in the RF message and adjusts the attack and delay time constants of the RSSI detector to allow accurate measurement of the amplitude of the signal, whatever its data rate. The RKE controller detects the amplitude difference errors introduced by RSSI errors in the relay devices. These amplitude difference errors will be particularly apparent in the check by the RKE controller of the relative amplitudes of the signals in the symbol intervals, since the normal variation in such relative amplitudes will be small.

Small step changes may be introduced in the frequency of the RF carrier at the fob and measured by the vehicle RKE controller, e.g. at the receiver IF frequency stage. This will force thieves to design their devices to have relatively broad bandwidth, which will tend to lower the dynamic range of the amplitude variations with which the receiver can cope and will thereby further impair the ability of the thief devices to reproduce the multilevel signal generated by the fob.

Other RF response signal parameters may also be checked to verify the fidelity of, and thus the veracity of, the RF response. Such other parameters may include the duration of each level or pulse (e.g., bit width, duty cycle). The receiver measurements may be accompanied by deliberate changes by the fob in the duration of various levels in the RF response. As before, the RKE controller will know the sequence of the changes and will measure the duration of each level or pulse and compare it against the expected duration.

Transmitting level, data rate, modulation format and occupant bandwidth can be implemented with receiver bandwidth change. The frequency content information can be checked at the receiver side. Low transmission level, low data rate, less occupant bandwidth transmission requires narrow to medium receiver bandwidth. Fast data rate, wideband modulation (such as FSK) transmission requires wide receiver bandwidth. The use of a very low level transmission demands the use of a relatively narrow band receiver to detect the signal. The thief device will not know in advance whether the next transmission coming out of the fob will be very weak or very strong level, thus the thief receiver will have to use a narrow bandwidth setting to detect possible fob weak signal transmission. However, in another symbol interval, the fob will transmit a wide band strong signal. The narrow or slightly above narrow bandwidth thief device will miss some of the frequency content of the transmitting signal. Consequently, when the thief device retransmits the fob signal, the original fob signal will be distorted, have reduced frequency content or correct information totally lost. This can be detected at the vehicle side by checking whether (1) correct data has been received, (2) pulse width is right, (3) the data duty cycle is correct, (4) frequency content and amplitude at each frequency region are correct (through a FFT analysis).

As stated earlier, the RKE controller may include a DSP for performing an FFT analysis thereby to measure the frequency content of the received fob signal and compare the measured content against expected content. Alternately, the FFT analysis could be performed by the RKE microcontroller, provided that the microcontroller employed has sufficient processor speed and available processing time. Other methods of detecting frequency content may alternatively be employed. For example, digital or analog filters could divide the receiving channel into multiple frequency bins (e.g., 6 parallel filters) to measure the level of the signal within each frequency band and compare it against the expected level. As another alternative, the receiver bandwidth could be reduced to a narrow band (such as 30 Khz) and then the input signal frequency-scanned at a certain frequency step (such as 30 KHz). With RSSI being measured at each band and compared to the expected level or content.

Figure 6:
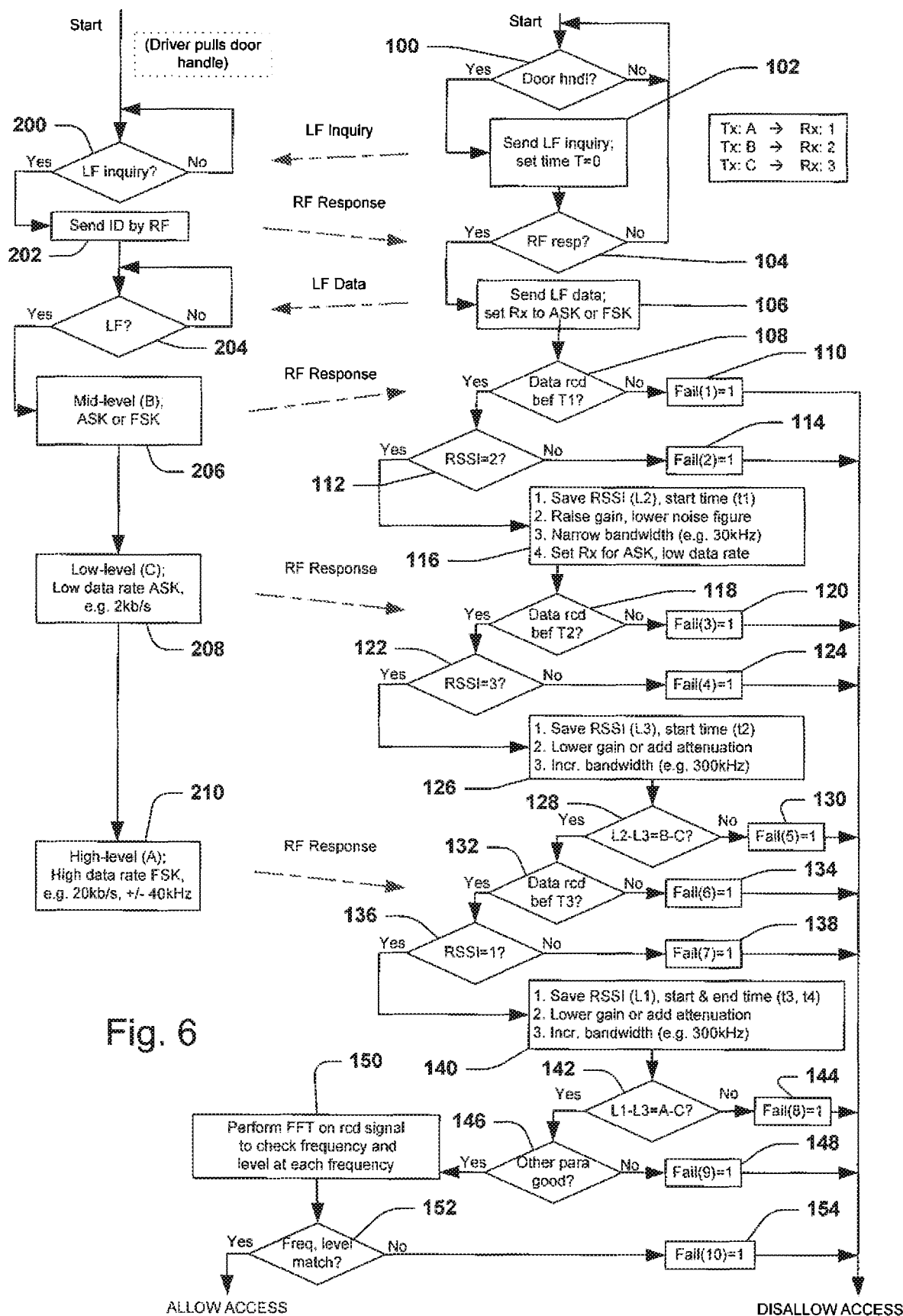
FIG. 6 is an flow chart useful in understanding the sequence of operations of one example embodiment of the present invention; and, FIG. 7($a$) through 7($e$) are signal diagrams and other illustrations useful in understanding various features of the described invention.

FIG. 6 is a flow chart that is useful in understanding the sequence of operations that take place at the fob and at the vehicle. The sequence on the left side of FIG. 6 reflects the operations that take place at the fob, and the sequence of operations on the right side of FIG. 6 reflects the operations that take place at the vehicle. The various LF and RF signal transmissions are represented by dotted lines between the fob and vehicle sequences.

The example sequence depicted in FIG. 6 generally follows the description above, but only reflects a sequence of transmitted power levels B-C-A. That is, the fob first transmits a mid-level signal (B), then a very low level signal (C) and finally a very high level signal (A). Moreover, in the example illustrated in FIG. 6, this sequence of power levels is mandated by the RKE controller, which sends the sequence to the fob via an encrypted LF data message. The LF data message indicates the sequence of the power levels and also the sequence of modulation (ASK or FSK) in each symbol interval.

More specifically, as illustrated in FIG. 6, the RKE controller 10 begins at step 100 by waiting for driver contact with the door handle. When door handle contact is detected, the process moves to step 102, where the LF inquiry is sent and the internal timer T is initialized to zero. In step 104, RKE controller 10 listens for a response from the fob. If no valid response is received, no further action is taken and the process is reset to step 100. If a valid RF response is received from the fob, however, then in step 106 the RKE controller sends LF data to the fob and sets the receiver to listen for ASK modulated data or FSK modulated data, as determined by the modulation instructions embedded in the LF data sent to the fob.

In step 108 the RKE controller determines whether proper data has been received from the fob before time T1. If not (step 110), the interaction between the fob and the RKE controller fails and RKE controller 10 disallows access to the vehicle. If proper data is received before T1, however (step 112), RKE controller 10 checks the received signal strength amplitude to see if the amplitude is within range 2 (as it would be if the fob transmitted at level B while near the vehicle). If not, then the interaction between the fob and the RKE controller again fails (step 114). If RSSI is in the proper range, however, then RKE controller 10 proceeds in step 116 to save actual RSSI level and start time t1, and to prepare the receiver for receipt of the next portion of the fob message. Since, in this example, the next fob transmission should be broadcast at a very low level C and ASK modulated, the receiver is set to a higher gain and lower noise figure, to a narrow bandwidth (e.g. 30 kHz), and to listen for ASK at a low data rate.

In step 118 RKE controller 10 determines whether proper data has been received from the fob before time T2. If not (step 120), the interaction between the fob and the RKE controller fails and RKE controller 10 disallows access to the vehicle. If proper data is received before T2, however (step 122), RKE controller 10 checks the received signal strength amplitude to see if the amplitude is within range 3 (as it would be if the fob transmitted at level C while near the vehicle). If not, then the interaction between the fob and the RKE controller again fails (step 124). If RSSI is in the proper range, however, then RKE controller 10 proceeds in step 126 to save actual RSSI level and start time t2, and to prepare the receiver for receipt of the next portion of the fob message. Since, in this example, the next fob transmission should be broadcast at a very high level A using FSK modulation, the receiver is set to a lower gain (or attenuation added), and a wide bandwidth (e.g. 300 kHz), and to listen for the appropriate modulation.

In the next step 128 the relative levels of the received signal in the first two amplitude symbol intervals is compared by subtracting the two amplitudes and comparing the difference to the expected difference. If the difference in amplitudes is not correct within a certain tolerance (step 130), the interaction between the fob and the RKE controller fails and RKE controller 10 disallows access to the vehicle.

In step 132 RKE controller 10 determines whether proper data has been received from the fob before time T3. If not (step 134), the interaction between the fob and the RKE controller fails and RKE controller 10 disallows access to the vehicle. If proper data is received before T3, however (step 136), RKE controller 10 checks the received signal strength amplitude to see if the amplitude is within range 1 (as it would be if the fob transmitted at level A while near the vehicle). If not, then the interaction between the fob and the RKE controller again fails (step 138). If RSSI is in the proper range, however, then RKE controller 10 proceeds in step 140 to save actual RSSI level, start time t3 and end time t4, and to return the receiver to the desired next state, illustrated in this example as low gain and broad bandwidth.

In the next step 142 the relative levels of the received signal in the most recent two amplitude symbol intervals is compared by subtracting the two RSSI amplitudes and comparing the difference to the expected difference. If the relative amplitudes are not correct within a certain tolerance (step 144), the interaction between the fob and the RKE controller fails and RKE controller 10 disallows access to the vehicle.

In FIG. 6, the times T1 and T2 are stored numbers that reflect the latest expected arrival times of the level transitions t1 and t2. Note that the receiver checks (a) whether the absolute RSSI levels in the respective intervals fall into the expected ranges, (b) whether the relative amplitudes of the received signal levels are correct, and (c) whether the transitions t1 etc. arrive within the expected range of times (prior to the stored times T1 etc.). If all of the foregoing is proper, the RKE controller proceeds to step 146, where a check is made as to whether "other parameters" (including pulse width, duty cycle, data rate) are good. If not, then the interaction between the fob and the RKE controller again fails (step 148). If the other parameters are good, however, than a final check is made in step 150 through an FFT analysis and a determination whether the level of the signal at each tested frequency or band is a match. If all of those elements of the received signal match expected levels, as tested in step 152, vehicle access is granted. Otherwise, (step 154) vehicle access is denied. In either case the process returns to the top of the FIG. 6 flowchart to begin again.

The steps taken by the fob 12 are shown on the left portion of FIG. 6. As illustrated, fob 12 listens (step 200) for an LF inquiry from the RKE controller. When received, fob 12 responds by broadcasting an RF message (step 202), containing the ID code that is unique to that the fob. Fob 12 then waits (step 204) for the receipt from RKE controller 10 of proper LF data representing broadcast instructions. Upon receipt of proper instructions, fob 12 will proceed to follow those instructions in the succeeding steps (steps 206-210). In step 206, fob 12 broadcasts a mid-level signal (level B) in ASK or FSK, as determined by the instructions. In step 208, fob 12 broadcasts a very low level signal (level C) using ASK modulation and a low data rate (e.g. 2 kb/s). In step 210, fob 12 broadcasts a very high level signal (level A) using FSK modulation and a relatively high data rate (e.g. 20 kb/s, +/−40 kHz). The respective fob broadcasts will be timed to follow the proper interval timing previously described.

Figure 7:
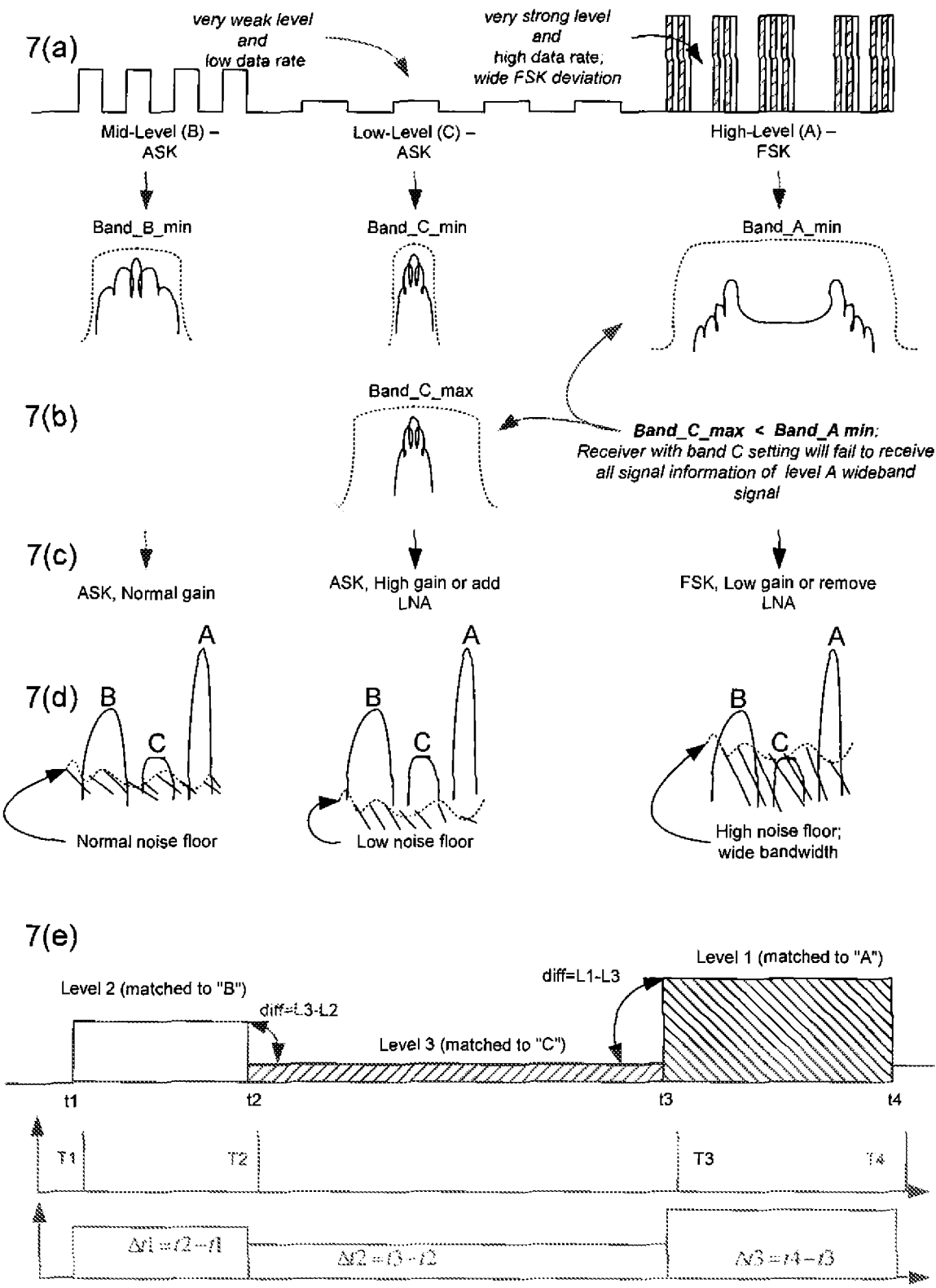

FIG. 7 illustrates the described features of the invention in a series of signal diagrams, again using the example where the fob transmits a signal level sequence B-C-A, as in the FIG. 6 flowchart. The fob signal is shown in FIG. 7(*a*). FIG. 7(*b*) illustrates the frequency spectrum of the signal during respective amplitude level intervals, and also illustrates in dotted lines the receiver bandwidth necessary to receive signals occupying those respective spectra. Note that the minimum receiver bandwidth necessary to receive the high level (A) signal is greater than the maximum bandwidth necessary to receive the low level (C) signal.

FIG. 7(*c*) identifies the gain and modulation settings that the receiver of the vehicle RKE controller will be given in different intervals to properly receive the fob signal of FIG. 7(*a*). FIG. 7(*d*) is an illustration of the noise floor for each receiver gain and bandwidth setting, with representations of the spectra of the signals (B-C-A). The spectra of the signals (B-C-A) are displaced from one another in FIG. 7(*d*) for simplicity of illustration. From FIG. 7(*d*) it can be seen that the noise floor when the receiver is set to receive a high level (A) signal will swamp the fob signal if the same setting is used to receive a low level (C) signal.

FIG. 7(*e*) illustrates various parameters, discussed above, that will be measured to quantify the fidelity of the received signal and thus to detect intrusion attempts. These include absolute RSSI level, relative RSSI level, received signal level transition time (t1 etc.) relative to latest expected transition time (T1 etc.), and other signal parameters (pulse width, duty cycle, data rate).

From the above description of the invention, those skilled in the art will perceive improvements, changes and modifications. For example, the communications from the vehicle RKE controller back to the fob may be done at the RF frequency to speed the rate of communication. All such improvements, changes and modifications within the skill of the art are intended to be covered by the appended claims.

Having described the invention, the following is claimed:

1. A method for preventing security breaches of passive remote keyless entry systems for a vehicle comprising:
    transmitting an inquiry signal from a remote keyless entry controller associated with the vehicle to a fob when a door handle contact is detected;
    receiving the inquiry signal at the fob;
    transmitting an inquiry signal response from the fob to the remote keyless entry controller that contains a fob identifier;
    receiving the inquiry signal response at the remote keyless entry controller;
    determining, at the remote keyless entry controller, if the received inquiry signal response containing the fob identifier is valid;
    when the remote keyless entry controller determines that the received inquiry signal response containing the fob identifier is valid, transmitting broadcast instructions from the remote keyless entry controller at the vehicle to the fob, the broadcast instructions including a particular sequence of power level changes for a response signal from the fob to follow;
    receiving the broadcast instructions at the fob;
    transmitting the response signal from the fob to the remote keyless entry controller at the vehicle at the power level which changes in the particular sequence received in the broadcast instructions; and
    receiving the response signal at the remote keyless entry controller at the vehicle;
    detecting, with the remote keyless entry controller, anomalies in the particular sequence of the response signal by:
    1) comparing detected absolute signal amplitudes in the particular sequence of the response signal to corresponding predetermined absolute signal amplitude ranges stored in the vehicle to determine incorrect absolute amplitudes in the particular sequence; and
    2) detecting incorrect relative signal amplitudes in the particular sequence.

2. The method as set forth in claim 1, wherein the transmitting the response signal from said fob comprises transmitting in the particular sequence that includes high level and low level transmissions, the method further comprising:
    receiving the response signal at a receiver connected to the remote keyless entry controller, wherein the receiver is configured with a first gain and/or bandwidth to receive the high level transmission and the receiver is configured with a second gain and/or bandwidth to receive the low level transmission.

3. The method as set forth in claim 1, wherein the detecting anomalies comprises detecting incorrect time delays in said particular sequence.

4. The method as set forth in claim 1, wherein the detecting anomalies further comprises detecting incorrect frequency content of said particular sequence.

5. The method as set forth in claim 1, wherein the detecting anomalies further comprises detecting incorrect ASK/FSK modulation of said particular sequence.

6. The method as set forth in claim 1, and further comprising changing said particular sequence each time said fob and said vehicle communicate.

7. The method as set forth in claim 1, and further comprising performing a vehicle function only if there are no unexpected anomalies in said particular sequence of said response signal.

8. The method as set forth in claim 1, wherein said response signal has data modulated thereon and wherein said transmitting comprises transmitting at a level which changes at a rate that is slower than the rate of said data.

9. The method as set forth in claim 1, wherein said predetermined sequence is encrypted.

10. The method as set forth in claim 1, wherein the transmitting the response signal from the fob to the remote keyless entry controller at the vehicle comprises transmitting the response signal having different amplitudes in different amplitude signal intervals, each different amplitude in the particular sequence being detected and separately compared to a corresponding predetermined absolute signal amplitude range stored in the vehicle to determine incorrect absolute amplitudes in the particular sequence.

11. The method as set forth in claim 1, further comprising disallowing access to the vehicle when the detected absolute signal amplitude falls outside the corresponding predetermined absolute signal amplitude range for a first time.

12. A method for preventing security breaches of a passive remote keyless entry system for a vehicle comprising:
    transmitting an inquiry signal from a remote keyless entry controller associated with the vehicle to a fob when door handle contact is detected;
    receiving the inquiry signal at the fob;
    transmitting an inquiry signal response from the fob to the remote keyless entry controller that contains a fob identifier;
    receiving the inquiry signal response at the remote keyless entry controller;
    determining, at the remote keyless entry controller, if the received inquiry signal response containing the fob identifier is valid;
    when the remote keyless entry controller determines that the received inquiry signal response containing the fob identifier is valid, transmitting broadcast instructions from the remote keyless entry controller at the vehicle to the fob, the broadcast instructions including a particular sequence of power level changes for a response signal from the fob to follow;
    receiving the broadcast instructions at the fob;
    transmitting the response signal from the fob to the remote keyless entry controller at the vehicle at the power level which changes in the particular sequence received in the broadcast instructions;
    receiving the response signal at the remote keyless entry controller at the vehicle;
    detecting, with the remote keyless entry controller, deviations of the received response signal from the particular sequence by:
    1) comparing detected absolute signal amplitudes in the sequence to corresponding predetermined absolute signal amplitude ranges stored in the vehicle to determine incorrect absolute amplitudes in the sequence, and
    2) detecting incorrect relative signal amplitudes in the sequence; and
    performing a vehicle function only if the deviations are within acceptable limits.

13. The method as set forth in claim 12, and further comprising changing said particular sequence each time said fob and said vehicle communicate.

14. The method as set forth in claim 12, wherein said response signal has data modulated thereon and wherein said transmitting the response signal comprises transmitting at a level which changes at a rate that is slower than the rate of said data.

15. The method as set forth in claim 12, wherein the performing the vehicle function comprises unlocking a vehicle door to allow entry into the vehicle.

16. The method as set forth in claim 12, wherein the performing the vehicle function comprises starting the vehicle.

17. The method as set forth in claim 12, wherein the transmitting the response signal from the fob to the remote keyless entry controller at the vehicle comprises the transmitting the response signal having different amplitudes in different amplitude signal intervals, each different amplitude in the particular sequence being detected and separately compared to a corresponding predetermined absolute signal amplitude range stored in the vehicle to determine incorrect absolute amplitudes in the particular sequence.

18. The method as set forth in claim 12, further comprising disallowing access to the vehicle when the detected absolute signal amplitude falls outside the corresponding predetermined absolute signal amplitude range for a first time.

\* \* \* \* \*